UNITED STATES PATENT OFFICE.

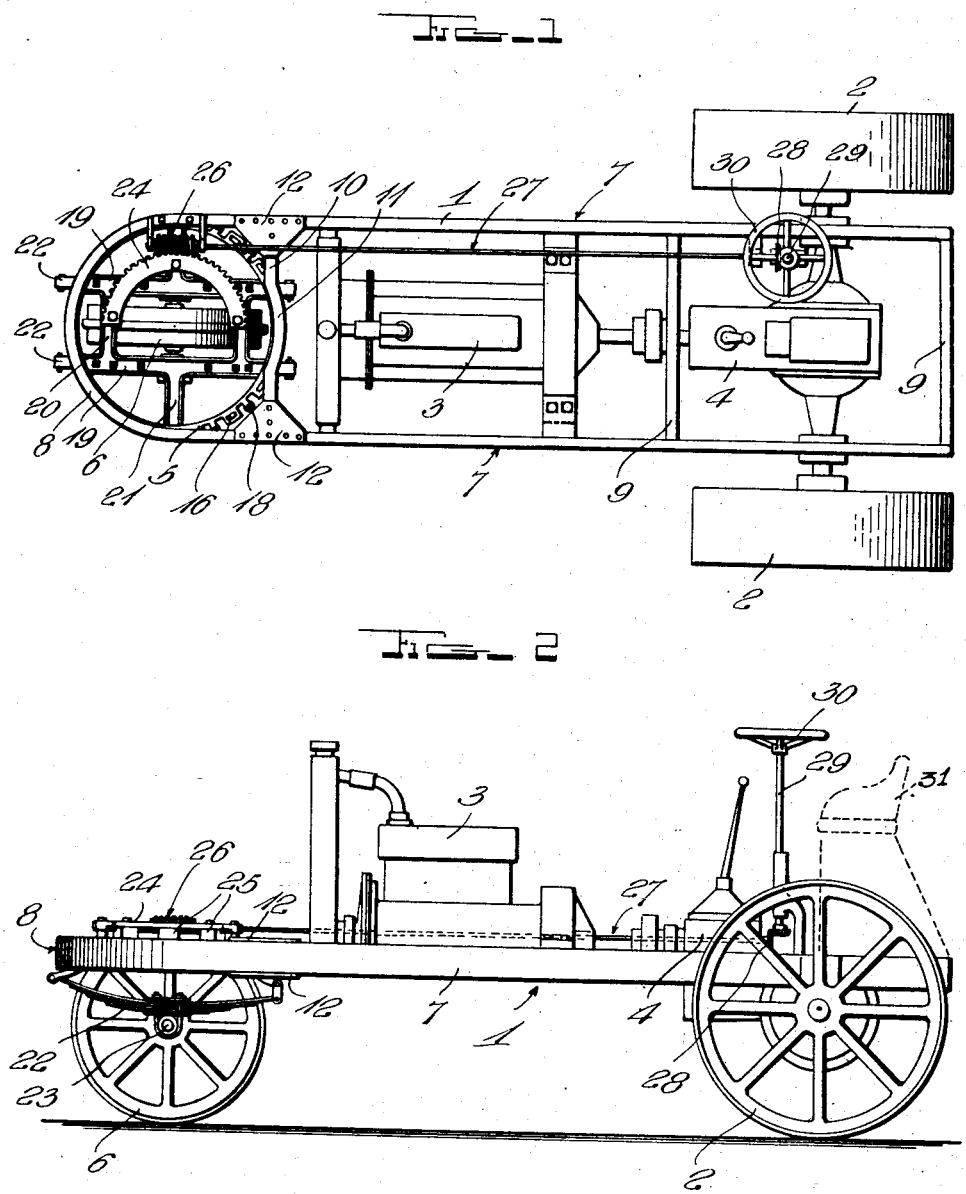

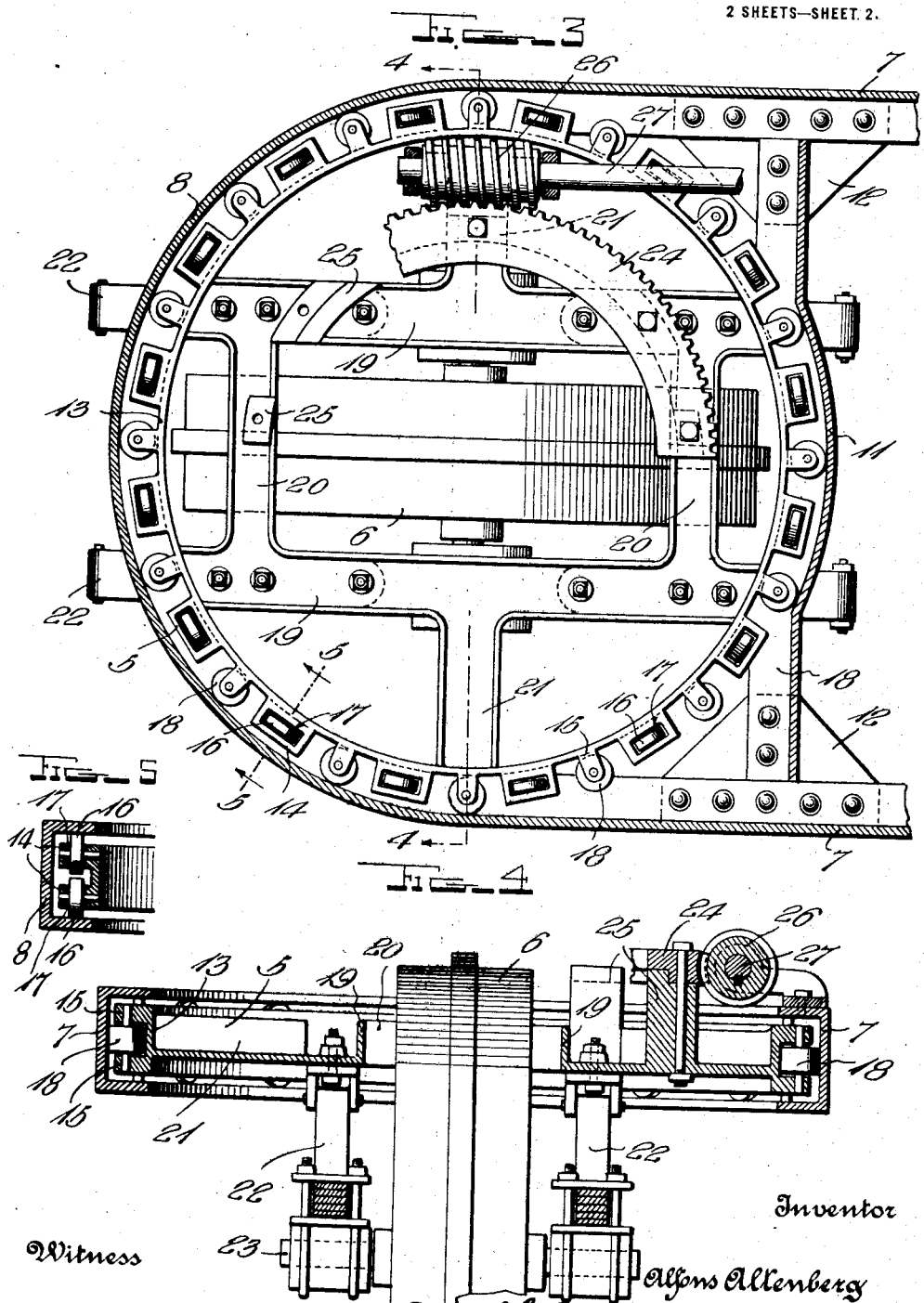

ALFONS ALTENBERG, OF RACINE, WISCONSIN.

WHEELED MACHINE.

1,273,985.

Specification of Letters Patent.

Patented July 30, 1918.

Application filed February 2, 1918. Serial No. 215,107.

*To all whom it may concern:*

Be it known that I, ALFONS ALTENBERG, a citizen of the Kingdom of Prussia, residing at Racine, in the county of Racine and State of Wisconsin, have invented certain new and useful Improvements in Wheeled Machines; and I do declare the following to be a full, clear, and exact description of the invention, such as will enable others skilled in the art to which it appertains to make and use the same.

The present invention has for one object to provide a front construction for farm and road tractors, trailers and the like, which will be free from a number of disadvantages now commonly existing, such as vertical springing or warping of the frame in such a manner as to interfere with the steering of the machine.

Another object is to provide a machine of this class by which short turns may be made without the so called caster wheel at the front, with its usual disadvantages, for instance necessitating that the front end of the frame be extended upwardly over the wheel, providing an additional angle at which the strain is usually such as to cause bending or other distortion.

A further object is to so construct the front assembly as to permit the use of springs between it and the front wheel or wheels, these springs being so arranged as to receive the thrust truly endwise when obstructions in the roadway or the field are encountered, either when traveling straight ahead or when turning.

The preferred construction for carrying out the above objects is herein described and is shown in the accompanying drawings in which:—

Figure 1 is a top plan of a tractor embodying my improvements;

Fig. 2 is a side elevation;

Fig. 3 is an enlarged top plan of the front construction with the frame in horizontal section; and Figs. 4 and 5 are vertical transverse sections on the planes of the lines 4—4 and 5—5 respectively of Fig. 3.

In the embodiment illustrated, a tractor is shown consisting briefly of a frame 1 preferably having its entire length disposed in a single horizontal plane, rear wheels 2, an engine 3 and transmission 4 for driving said wheels, a turntable 5 at the front end of frame 1, and one or more front wheels 6, together with the details of construction described below.

The side bars 7 and the curved front end 8 of frame 1 are formed of a single channel steel bar with its channel disposed inward and said side bars are connected at suitable intervals by transverse bars 9 and an additional bar 10, the foremost bar 10 and preferably the others being formed of channel steel. The front 8 of frame 1 is by preference of truly semi-circular shape and the intermediate portion 11 of bar 10 is bowed rearwardly on an arc having the same radius as said end, the two coöperating in forming practically a complete circular internally channeled track for the turntable 5. The ends of the bar 10 are secured to the side bars 7 of frame 1, in most cases by means of the triangular bracket plates 12 riveted or bolted to both.

The turntable 5 includes a peripheral ring 13 circumscribed by the aforesaid track and having relatively large lugs 14 spaced apart around its circumference, and smaller vertically spaced lugs 15 between said lugs 14. Vertically disposed antifriction rollers 16 are mounted in openings 17 formed in the lugs 14 and similar but horizontal rollers 18 are mounted between the lugs 15, said rollers 16 traveling on the horizontal flanges of the front end 8 of frame 1 and the bar 10 to support the weight of the front end of said frame, while the rollers 18 travel on the vertical portions of said parts 8 and 10 and receive all longitudinal and lateral thrust.

Joined integrally or otherwise at their ends to the ring 13 and spanning said ring, are two longitudinal bars 19 connected near their ends by transverse bars 20 and having their centers connected to the ring by lateral bars 21, all of said bars 19, 20, and 21 being by preference of channel shape for extreme strength and rigidity without excessive weight. By any suitable means, a pair of longitudinal, and preferably semi-elliptic springs 22 are connected to the bars 19, said springs being interposed between said bars and the front axle 23 which may carry one front wheel 6 or two if desired.

It will be seen by reference to the drawings that regardless of the direction of travel, any obstructions encountered by the wheel or wheels 6 will exert a truly longitudinal thrust on the springs 22 and will thus have no injurious effect thereon and will not even momentarily impair their efficiency.

For steering, a worm segment 24 is secured to integral lugs 25 rising from the bars 20 and one bar 21 of the turntable 5, and a worm 26 on the front end of a longitudinal shaft 27, meshes with said segment. Shaft 27 is suitably mounted on the frame 1 and by bevel gears or the like 28 is operatively connected with a steering shaft 29 having a hand wheel 30, said wheel and the controls for the engine, transmission and brakes being located in easy reach of the operator for whom a suitable seat 31 is provided.

The construction above described is simple and comparatively inexpensive yet is highly efficient and durable. The front end of the frame is relieved of the usual shocks by the springs 22, regardless of the direction of travel and these springs permit the necessary vertical oscillation of the axle 23 without having any tendency to warp the front end of the frame or to cause binding of the turntable 5. The several rollers 18 receive all lateral and longitudinal thrust, and the rollers 16 support the weight of the front end of the frame 1, yet they do not in any manner interfere with proper turning of the turntable. The rollers are accessible for repairing, lubricating, etc., at the gaps in their tracks between the bar 10 and the frame end 8.

Since probably the best results are obtained from the features shown, they are preferably employed, but within the scope of the invention as claimed numerous changes may well be made. Also the improvements are applicable not only to tractors, but to trailers, farm and road machinery and in fact to all forms of wheeled structures requiring the use of such an arrangement.

I claim:—

1. In a wheeled machine, the combination of a horizontal frame whose front end is formed of a channel metal bar of substantially semi-circular shape with its channel disposed inwardly, a wheel supported turntable having substantially half of its circumference positioned in the channel of said frame end and having vertical and horizontal rollers engaging the vertical and horizontal portions thereof, and a transverse bar rigidly carried by the frame in rear of said turntable and engaging the rollers thereof, said bar forming a continuation of the semi-circular track of said rollers.

2. A structure as specified in claim 1, said transverse bar being formed of channel metal with its channel disposed forwardly and receiving said rollers therein, the intermediate portion of said bar being bowed rearwardly on the radius of said frame end.

In testimony whereof I have hereunto set my hand in the presence of two subscribing witnesses.

ALFONS ALTENBERG.

Witnesses:
 CHRISTIAN JOHNSON,
 WM. LOHSE.

Copies of this patent may be obtained for five cents each, by addressing the "Commissioner of Patents, Washington, D. C."